(12) United States Patent
Choi et al.

(10) Patent No.: US 8,901,841 B2
(45) Date of Patent: Dec. 2, 2014

(54) AC LED DIMMER AND DIMMING METHOD THEREBY

(71) Applicant: Seoul Semiconductor Co., Ltd., Ansan-si (KR)

(72) Inventors: Byung Hoon Choi, Ansan-si (KR); In Kyu Park, Ansan-si (KR)

(73) Assignee: Seoul Semiconductor Co., Ltd., Seoul (KR)

( * ) Notice: Subject to any disclaimer, the term of this patent is extended or adjusted under 35 U.S.C. 154(b) by 46 days.

(21) Appl. No.: 13/692,371

(22) Filed: Dec. 3, 2012

(65) Prior Publication Data

US 2013/0093341 A1 Apr. 18, 2013

Related U.S. Application Data

(63) Continuation of application No. 12/554,513, filed on Sep. 4, 2009, now Pat. No. 8,324,823.

(30) Foreign Application Priority Data

Sep. 5, 2008 (KR) .................. 10-2008-0087758

(51) Int. Cl.
*H05B 37/02* (2006.01)
*H05B 39/04* (2006.01)
*H05B 41/36* (2006.01)
*G06F 1/00* (2006.01)
*H05B 33/08* (2006.01)

(52) U.S. Cl.
CPC ............ *H05B 37/02* (2013.01); *H05B 33/0809* (2013.01); *H05B 33/0815* (2013.01); *Y02B 20/346* (2013.01)
USPC ........................................ 315/224; 315/291

(58) Field of Classification Search
CPC ........... H05B 41/3925; H05B 41/2828; H05B 41/28; H05B 41/2827; H05B 41/2855; H05B 41/24; H05B 33/0815; H05B 33/0818; F02D 3/0884; H01J 65/044

USPC .......................................... 315/224, 223, 291
See application file for complete search history.

(56) References Cited

U.S. PATENT DOCUMENTS 5,661,645 A * 8/1997 Hochstein ................... 363/89
5,872,429 A * 2/1999 Xia et al. .................. 315/194

(Continued)

FOREIGN PATENT DOCUMENTS

CN 201063902 5/2008
DE 4433552 3/1996

(Continued)

OTHER PUBLICATIONS

Artistic License Ltd., "An overview of the electronic drive techniques for intensity control and colour mixing of low voltage light sources such as LEDs and LEPs," London, UK, 2002 (Application Note 011).

(Continued)

*Primary Examiner* — Dylan White
(74) *Attorney, Agent, or Firm* — H.C. Park & Associates, PLC

(57) ABSTRACT

The disclosure relates to an AC LED dimmer and dimming method thereof. The AC LED dimmer includes a rectifier receiving AC voltage from an AC voltage source and full-wave rectifying the AC voltage; a direct current (DC)/DC converter receiving the full-wave rectified voltage from the rectifier, generating a full-wave rectified stepped-up voltage, and generating a pulse enable signal; a pulse width modulation controller receiving the full-wave rectified stepped-up voltage and generating a pulse width modulation signal to dim an AC LED in response to the pulse enable signal; a switch driving the AC LED under control of the pulse width modulation signal, and an electromagnetic interference (EMI) filter to be connected between the AC voltage source and the switch to eliminate electromagnetic interference from the AC voltage source. Accordingly, the dimmer can perform an efficient and linear dimming function and suppress harmonics.

6 Claims, 8 Drawing Sheets

(56) References Cited

U.S. PATENT DOCUMENTS

| | | | |
|---|---|---|---|
| 6,208,122 B1 | 3/2001 | Yuan | |
| 6,412,971 B1 | 7/2002 | Wojnarowski et al. | |
| 7,019,469 B1 | 3/2006 | Thurk et al. | |
| 7,262,559 B2 | 8/2007 | Tripathi et al. | |
| 7,378,805 B2 | 5/2008 | Oh et al. | |
| 7,952,294 B2* | 5/2011 | Shteynberg et al. | 315/224 |
| 8,049,430 B2* | 11/2011 | Newman et al. | 315/224 |
| 8,049,436 B2 | 11/2011 | Wang et al. | |
| 8,098,021 B2 | 1/2012 | Wang et al. | |
| 8,222,825 B2* | 7/2012 | Kang et al. | 315/209 R |
| 8,362,710 B2* | 1/2013 | Langovsky | 315/291 |
| 2006/0071614 A1* | 4/2006 | Tripathi et al. | 315/291 |
| 2007/0182338 A1 | 8/2007 | Shteynberg et al. | |
| 2009/0273297 A1 | 11/2009 | Kelly | |
| 2011/0080112 A1 | 4/2011 | Shearer et al. | |
| 2011/0127925 A1* | 6/2011 | Huang et al. | 315/287 |
| 2011/0181196 A1* | 7/2011 | Kang et al. | 315/246 |
| 2012/0001561 A1* | 1/2012 | Balakrishnan | 315/209 R |
| 2013/0088078 A1* | 4/2013 | Shteynberg et al. | 307/31 |
| 2014/0152188 A1* | 6/2014 | Bora et al. | 315/210 |

FOREIGN PATENT DOCUMENTS

| | | |
|---|---|---|
| JP | 03-198665 | 8/1991 |
| JP | 04-215297 | 8/1992 |
| JP | 10-191467 | 7/1998 |
| JP | 2000-357590 | 12/2000 |
| JP | 2001-284071 | 10/2001 |
| JP | 2002-016290 | 1/2002 |
| JP | 2002-175124 | 6/2002 |
| JP | 2003-031385 | 1/2003 |
| JP | 2005-267999 | 8/2005 |
| JP | 2006-172820 | 6/2006 |
| JP | 2007-005255 | 1/2007 |
| JP | 2008-103242 | 5/2008 |
| KR | 20-0389959 | 7/2005 |
| TW | 200428896 | 12/2004 |
| TW | 200704284 | 1/2007 |
| TW | 200816869 | 4/2008 |

OTHER PUBLICATIONS

Stelzer, Gerhard, "LEDs for the socket," Elektronik, Issue 25, 2006.

Notice of Allowance and Fees for related U.S. Appl. No. 12/554,513 dated Aug. 17, 2012.

Non-Final Office Action for related U.S. Appl. No. 12/554,513 dated Mar. 2, 2012.

Preliminary Notice of First Office Action and Search Report issued in Taiwanese Application No. 098129866 dated May 20, 2013.

* cited by examiner

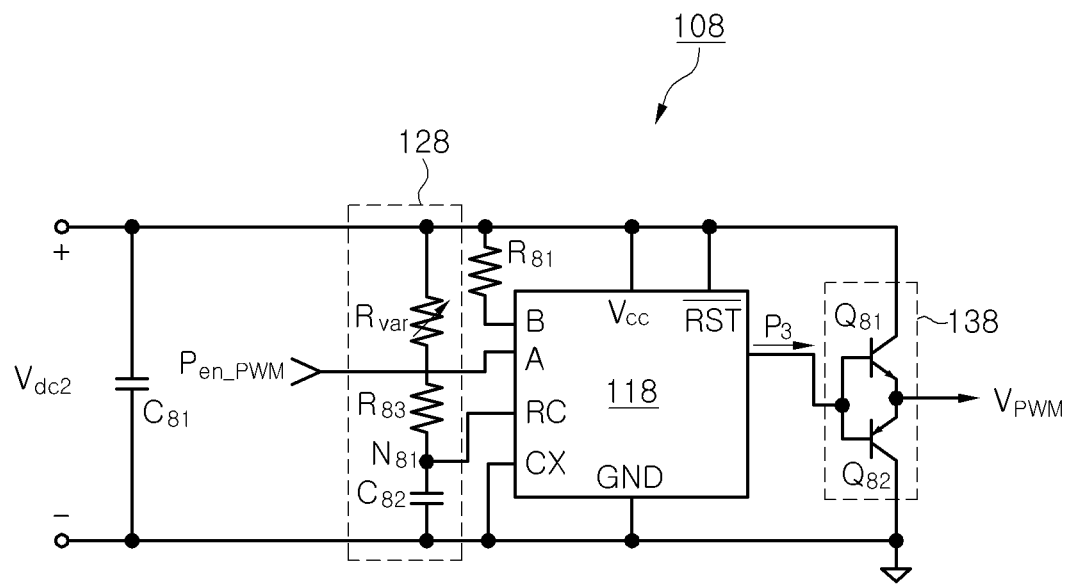
FIG. 8
FIG. 9A
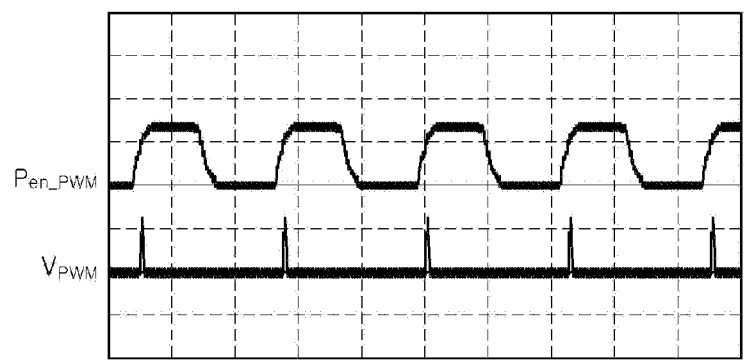

AC LED DIMMER AND DIMMING METHOD THEREBY

CROSS REFERENCE TO RELATED APPLICATIONS

This application is a continuation of U.S. patent application Ser. No. 12/554,513, filed on Sep. 4, 2009, and claims priority from and the benefit of Korean Patent Application No. 10-2008-0087758, filed on Sep. 5, 2008, which are both hereby incorporated by reference for all purposes as if fully set forth herein.

BACKGROUND OF THE INVENTION

1. Field of the Invention

Exemplary embodiments of the present invention relate to an alternating current (AC) light-emitting diode (LED) dimmer and a dimming method thereby and, more particularly, to an AC LED dimmer which performs a dimming function of an AC LED by bidirectionally switching AC voltage at a high speed under control of a pulse width modulation signal, and a dimming method thereby.

2. Discussion of the Background

In general, a lamp may have a dimming function that allows a user to control brightness of the lamp, but such a function has been restrictively used in practice. As energy saving has become an important concern in association with an increase in electrical energy consumption, the dimming function of the lamp becomes an essential function, rather than an optional function, to save energy. Further, a light-emitting diode (LED) has attracted attention as an environmentally friendly lighting source to save electric energy.

A conventional representative dimmer dims an AC LED by adjusting the root-mean-square (RMS) value (Vrms) of AC voltage by controlling the AC phase of the AC voltage using a semiconductor device such as a triode for alternating current (Triac).

A Triac is an electronic component approximately equivalent to two silicon-controlled rectifiers (SCRs/thyristors) connected to each other in inverse parallel (parallel but with the polarity reversed) and with their gates connected together. The Triac can be triggered by either a positive or a negative voltage applied to its gate electrode, and, once triggered, it continues to conduct until the current through the Triac drops below a certain threshold value. Triacs are well known in the art and a detailed description thereof will be omitted herein.

Such a phase control scheme adjusts the RMS value of output voltage by driving the Triac after a predetermined delay from when an input voltage is 0V (at the moment when the input voltage starts to rise or decrease). However, the phase control scheme and the traditional dimming method using the Triac are limited in terms of operating range due to a controller configured to drive the Triac and inherent characteristics of the Triac.

The traditional dimmer and dimming method will be described with reference to the accompanying drawings.

FIG. 1 is a block diagram of a traditional dimmer using a Triac. The dimmer 10 includes a Triac 14 and a resistor/capacitor (R/C) phase controller 16. The Triac 14 supplies or blocks AC voltage from an AC voltage source 12 to a lamp, i.e. an AC LED 18, and the R/C phase controller 16 controls the Triac 14. Hence, the Triac 14 is turned on by a gate turn-on signal $I_G$ from the R/C phase controller 16 to allow the AC voltage to be supplied to the AC LED 18.

The dimmer 10 generates a phase control signal, i.e., gate turn-on signal $I_G$, using a resistor R and a capacitor C, when the AC input voltage is 0V, to drive the Triac 14. The phase control signal is an AC voltage signal delayed by a time constant determined by the resistor and the capacitor.

Considering the operating characteristics of a typical Triac, the dimming range of the dimmer 10 is limited depending on the drive voltage of the Triac.

FIG. 2 is a waveform graph of AC input voltage $v_1$ and AC input current $i_1$ in the traditional dimmer in FIG. 1. Referring to FIG. 2, the phase control scheme using the Triac leads to a non-sinusoidal waveform of the current $i_1$.

When the AC input voltage is 0V, a phase control signal, i.e., gate turn-on signal $I_G$ in FIG. 1, which is generated using the resistor R and the capacitor C, causes the Triac 14 (see FIG. 1) to abruptly conduct current due to the operation characteristics of the Triac, thereby resulting in the non-sinusoidal waveform of the current $i_1$, as shown in FIG. 2.

Further, a time point when the current $i_1$ starts to flow in the current waveform depends on the resistor and the capacitor of the R/C phase controller 16. In determining such a phase delay, an operating margin of the resistor and the capacitor is required. An insufficient operating margin may cause the gate turn-on signal $I_G$ (see FIG. 1) to instantaneously flow, thereby causing the AC LED to flicker.

As such, there is a problem in that a minimum dimming range and a maximum dimming range are very limited due to the drive voltage of the Triac and the characteristics of the resistor and capacitor of the R/C phase controller.

In addition, the Triac is abruptly switched by the gate turn-on signal in the phase control scheme using the Triac, thereby producing a number of harmonics during the switching process (especially, turn-on time denoted by reference numeral 20 in FIG. 2).

Accordingly, a new AC voltage source driver and controller are needed to achieve a broader control range and a linear dimming function.

SUMMARY OF THE INVENTION

Exemplary embodiments of the present invention provide an improved AC LED dimmer and dimming method capable of addressing the problem of the conventional dimmer in which the dimming range is limited by the drive voltage of the Triac and the characteristics of the resistor and capacitor of the R/C phase controller.

Exemplary embodiments of the present invention also provide an improved AC LED dimmer and dimming method capable of addressing the problem of the conventional dimmer in which a number of harmonics are produced in the turn-on switching operation.

Exemplary embodiments of the present invention also provide an improved AC LED dimmer and dimming method capable of reducing or minimizing flickering of the AC LED caused by the insufficient operating margin of the resistor and capacitor of the R/C phase controller in the conventional dimmer.

Additional features of the invention will be set forth in the description which follows, and in part will be apparent from the description, or may be learned by practice of the invention.

An exemplary embodiment of the present invention discloses an alternating current (AC) light-emitting diode (LED) dimmer that includes a rectifier to receive AC voltage from an AC voltage source and to first full-wave rectify the AC voltage. A voltage converter is included in the dimmer to receive the first full-wave rectified voltage from the rectifier, to generate a second full-wave rectified stepped-up voltage, and to generate a pulse enable signal. The dimmer also includes a pulse width modulation controller to receive the second full-wave rectified stepped-up voltage and to generate a pulse width modulation signal to dim an AC LED in response to the pulse enable signal; and a switch to drive the AC LED under control of the pulse width modulation signal.

An exemplary embodiment of the present invention also discloses an AC LED dimming method that includes receiving AC voltage and generating a pulse width modulation signal. The method includes driving an AC LED under control of the pulse width modulation signal; and dimming the AC LED by adjusting a duty cycle of the pulse width modulation signal.

An exemplary embodiment of the present invention also discloses an AC LED dimming method that includes receiving and first full-wave rectifying AC voltage to generate first full rectified voltage. The method includes generating second full-wave rectified stepped-up voltage from the first full-wave rectified voltage, and generating a pulse enable signal. The method includes generating a pulse width modulation signal from the second full-wave rectified stepped-up voltage and in response to the pulse enable signal. The method also includes switching bidirectionally according to the AC voltage under control of the pulse width modulation signal to drive an AC LED; and dimming the AC LED by adjusting a duty cycle of the pulse width modulation signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 8 is a circuit diagram of an exemplary embodiment of a pulse width modulation controller in FIG. 3.

FIG. 9A is a waveform when a pulse width modulation signal $V_{PWM}$ indicates a minimum output.

DETAILED DESCRIPTION OF THE ILLUSTRATED EMBODIMENTS

Figure 1:
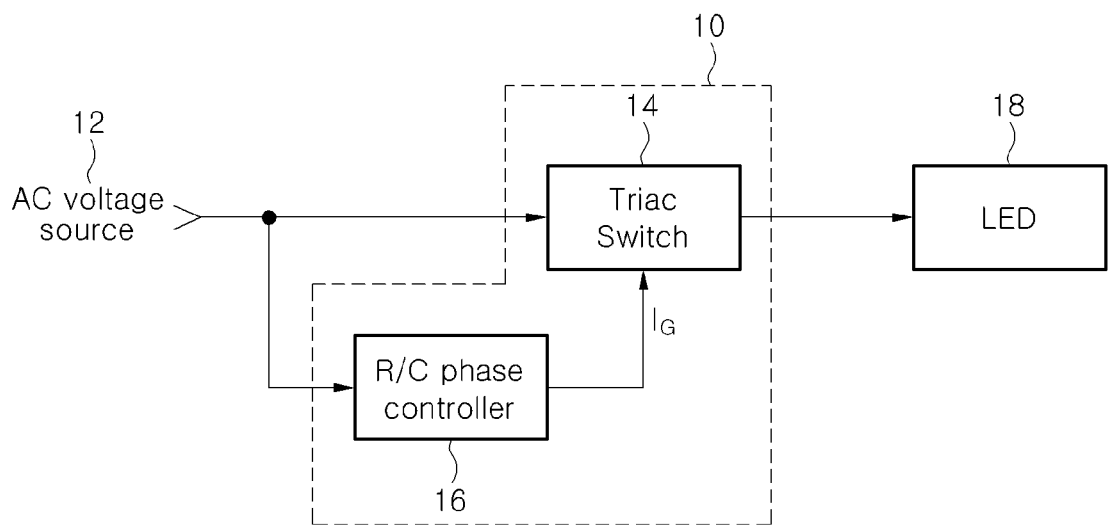
FIG. 1 is a block diagram of a traditional dimmer using a Triac.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. Likewise, when an element is referred to as being "connected between" other elements, it can be directly connected to each of the other elements or intervening elements may be present. In contrast, when an element is referred to as being "directly connected between" other elements, there are no intervening elements present.

Figure 3:
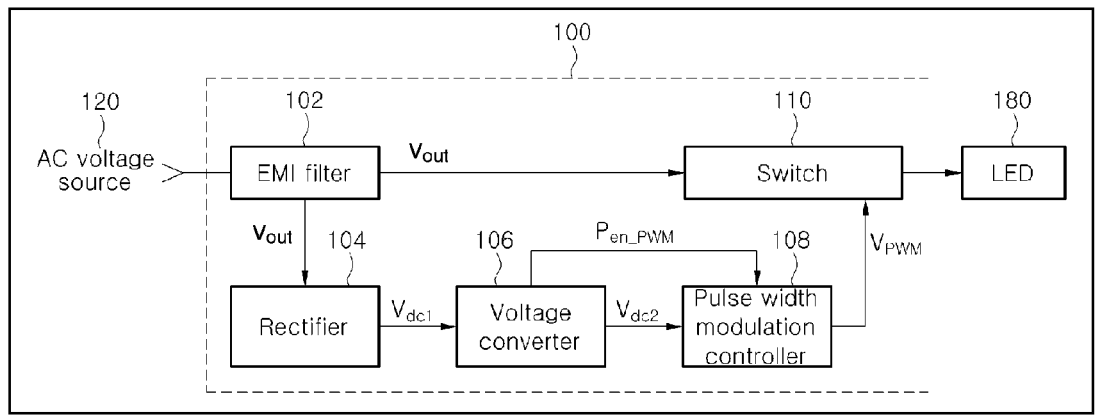
FIG. 3 is a block diagram of an AC LED dimmer according to an exemplary embodiment of the present invention.

FIG. 3 is a block diagram of an alternating current (AC) light-emitting diode (LED) dimmer according to an exemplary embodiment of the present invention.

The AC LED dimmer 100 includes an electromagnetic interference (EMI) filter 102, an alternating current to direct current (AC/DC) rectifier 104, a voltage converter 106, a pulse width modulation (PWM) controller 108 and a switch 110.

The EMI filter 102 is connected between an AC voltage source 120 and the switch 110 and acts to eliminate electromagnetic interference included in the AC voltage source 120. That is, the EMI filter 102 eliminates an impulse noise, harmonics or the like due to electromagnetic interference inside or outside the dimmer 100 which is produced in a power line between the AC voltage source 120 and an AC LED 180. The EMI filter 102 may be optional, but is preferably included to reduce the electromagnetic interference and improve a power factor.

The AC/DC rectifier 104 receives an AC voltage from the AC voltage source 120 and full-wave rectifies it into a direct current (DC) voltage $V_{dc1}$. The EMI filter 102 allows the AC/DC rectifier 104 to receive a voltage $v_{out}$ having reduced electromagnetic interference.

The voltage converter 106 receives a voltage $V_{dc1}$ which is full-wave rectified by the AC/DC rectifier 104, and outputs a voltage $V_{dc2}$, which is full-wave rectified and stepped up, and a pulse enable signal $P_{en\_PWM}$. That is, the voltage converter 106 outputs the DC voltage $V_{dc2}$, which is isolated from the AC voltage source 120, and also outputs the pulse enable signal $P_{en\_PWM}$ to be used in generating a pulse width modulation signal $V_{PWM}$.

The PWM controller 108 receives the voltage $V_{dc2}$ from the voltage converter 106 and generates a pulse width modulation signal $V_{PWM}$ in response to the pulse enable signal $P_{en\_PWM}$.

The switch 110 drives the AC LED 180 under the control of the pulse width modulation signal $V_{PWM}$. If the EMI filter 102 is employed, the switch 110 receives the voltage $v_{out}$ having reduced electromagnetic interference and drives the AC LED 180.

Accordingly, the AC LED dimmer 100 including the above-mentioned elements can solve the problems of the conventional dimmer employing the Triac, i.e., a limited dimming range due to the drive voltage of the Triac and the characteristics of the resistor and capacitor of the R/C phase controller, harmonics produced in the turn-on switching operation, and flickering of the AC LED due to an insufficient margin of the resistor and capacitor of the R/C phase controller.

Figure 4:
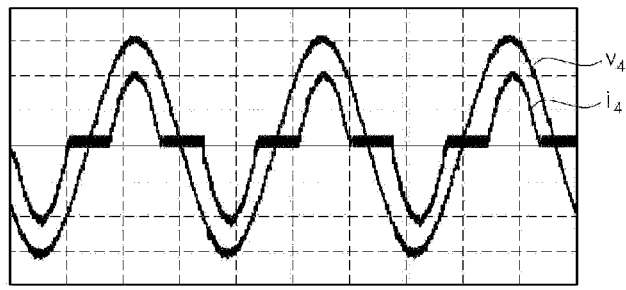
FIG. 4 is a waveform graph of AC input voltage and current in the AC LED dimmer in FIG. 3.

FIG. 4 is a waveform graph illustrating AC input voltage $v_4$ and current $i_4$ when the AC LED dimmer in FIG. 3 is employed. The term input voltage refers to an input voltage to the AC LED 180. The graph of the input voltage and current illustrates a pulse width modulation signal $V_{PWM}$ having a duty cycle of 100%.

Figure 2:
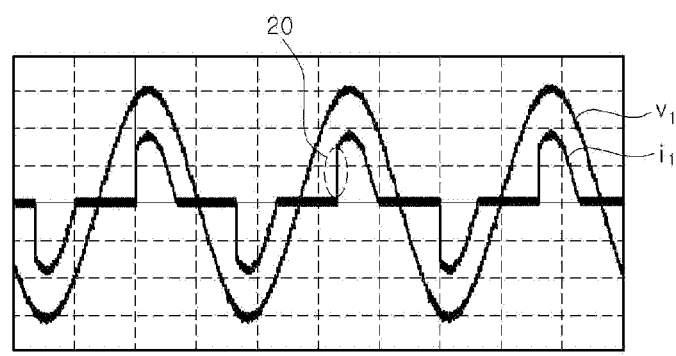
FIG. 2 is a waveform graph of AC input voltage and current in the dimmer in FIG. 1.

Comparing FIG. 4 with FIG. 2, although voltage waveforms $v_1$ and $v_4$ are similar (AC voltage source is assumed to be identical), the current waveform $i_4$ in FIG. 4 is closer to sinusoidal. Further, it is possible to suppress harmonics that may be produced when the Triac is abruptly turned on as in the current waveform $i_1$ in FIG. 2.

Figure 5A:
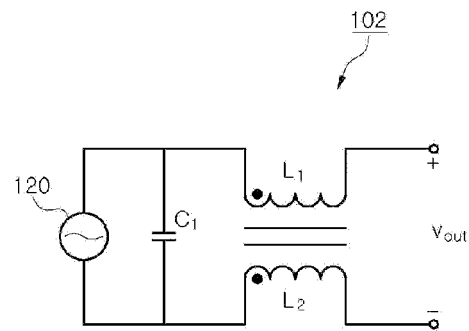
FIG. 5A and FIG. 5B are circuit diagrams of exemplary embodiments of an electromagnetic interference filter in FIG. 3.
Figure 5B:
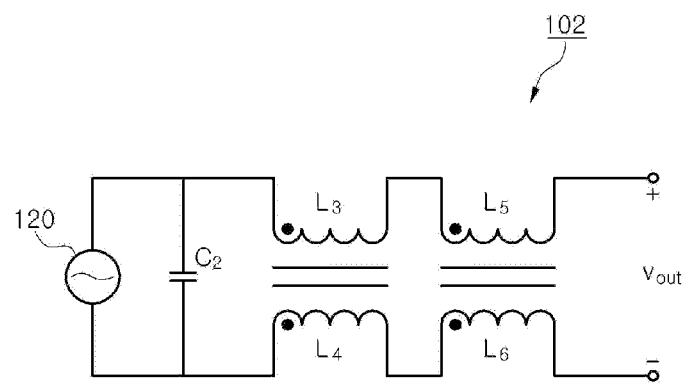

FIG. 5A and FIG. 5B are exemplary embodiments of circuit diagrams illustrating the EMI filter 102 in FIG. 3. Referring to FIG. 5A, the EMI filter 102 is a line filter (also referred to as an AC line filter) including a filter capacitor $C_1$ and common mode inductors $L_1$ and $L_2$. The line filter is an LC low pass filter which may reduce electromagnetic interference included in a voltage source. The AC voltage $v_{out}$ is a voltage having reduced electromagnetic interference.

The EMI filter 102 may be designed such that the filter capacitor $C_1$ has a low capacitance and the common mode inductors $L_1$ and $L_2$ have a large inductance to enhance the power factor.

The common mode inductors $L_1$ and $L_2$ formed of a single stage as shown in FIG. 5A may be physically limited by number of windings, size and the like. In order to overcome such physical limitations and increase inductance of the common mode inductors to thereby increase the power factor, the common mode inductors may be formed of two or more stages which are connected to each other in series.

FIG. 5B illustrates two stages of common mode inductors $L_3$ and $L_4$ and $L_5$ and $L_6$ which are connected in series to each other. FIG. 5B is provided only for illustrative purposes and the common mode inductors may be formed of three or more stages.

Accordingly, by using the EMI filter 102, it is possible to produce a nearly sinusoidal input current to the AC LED 180, to suppress harmonics and to reduce electromagnetic interference.

Figure 6:
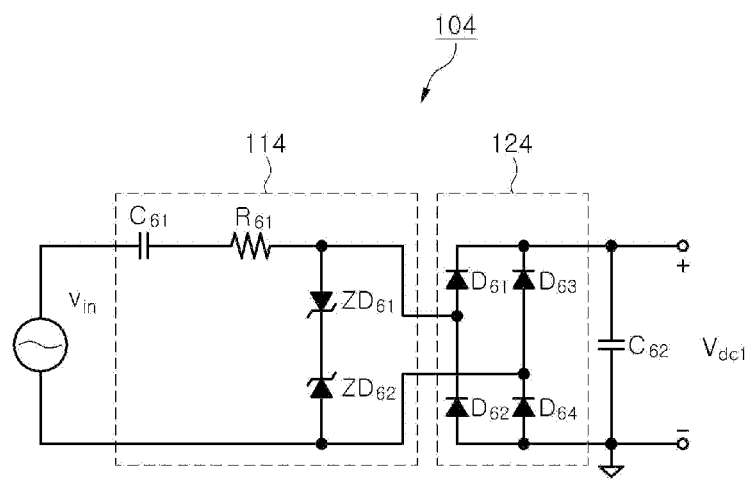
FIG. 6 is a circuit diagram of an exemplary embodiment of a rectifier in FIG. 3.

FIG. 6 is a circuit diagram illustrating an exemplary embodiment of the AC/DC rectifier 104 in FIG. 3. The AC/DC rectifier 104 includes a voltage divider 114 to divide voltage of an AC voltage source $v_{in}$, a first full-wave rectifying unit 124 to full-wave rectify the voltage divided by the voltage divider 114, and a first voltage stabilizer having a capacitor $C_{62}$ to stabilize the voltage full-wave rectified by the first full-wave rectifying unit 124.

Here, the AC voltage source $v_{in}$ may be an AC voltage source 120 with no electromagnetic interference filtered or, if the EMI filter 102 is used, an AC voltage source ($v_{out}$ in FIG. 5A or FIG. 5b) with electromagnetic interference filtered.

The voltage divider 114 includes a capacitor $C_{61}$ which is connected in series to the AC voltage source $v_{in}$, a resistor $R_{61}$, which is connected in series to the capacitor $C_{61}$, and a pair of Zener diodes $ZD_{61}$ and $ZD_{62}$ which are connected in series to the resistor $R_{61}$. A predetermined Zener voltage $V_{ZD}$ across the Zener diodes $ZD_{61}$ and $ZD_{62}$ is connected in parallel to an input of the first full-wave rectifying unit 124.

The pair of Zener diodes $ZD_{61}$ and $ZD_{62}$ are connected in inverse series to provide predetermined Zener voltages $V_{ZD}$ and $-V_{ZD}$ under the AC voltage source $v_{in}$.

An operation of the AC/DC rectifier 104 will now be described in detail.

Since the capacitor $C_{61}$, the resistor $R_{61}$ and the pair of Zener diodes $ZD_{61}$ and $ZD_{62}$ are connected in series to the AC voltage source $v_{in}$ and the pair of Zener diodes $ZD_{61}$ and $ZD_{62}$ are connected to an input of the first full-wave rectifying unit 124, the pair of Zener diodes $ZD_{61}$ and $ZD_{62}$ act to limit an input voltage of the first full-wave rectifying unit 124 to a predetermined Zener voltage $V_{ZD}$.

The voltage across the capacitor $C_{61}$ may vary depending on power consumption of the capacitor $C_{62}$ of the first voltage stabilizer. In this case, for the capacitor $C_{61}$, the resistor $R_{61}$ and the pair of Zener diodes $ZD_{61}$ and $ZD_{62}$, which are connected in series to each other, the voltage of the AC voltage source $v_{in}$ is divided in a predetermined proportion, and the AC input voltage of the first full-wave rectifying unit 124 including diodes $D_{61}$, $D_{62}$, $D_{63}$ and $D_{64}$ varies depending on the power consumption of the capacitor $C_{62}$.

Hence, the capacitance of the capacitor $C_{61}$ may be designed in consideration of the power consumption of the capacitor $C_{62}$. For example, the capacitor $C_{61}$ may have a capacitance of 100 to 330 nF.

Further, the pair of Zener diodes $ZD_{61}$ and $ZD_{62}$ may be optional according to whether the capacitor $C_{61}$ may be optimally designed taking into account the power consumption of the capacitor $C_{62}$.

The capacitor $C_{62}$ forms the first voltage stabilizer. The first voltage stabilizer stabilizes the voltage rectified by the first full-wave rectifying unit 124 into DC voltage and provides it to the voltage converter 106.

Figure 7:
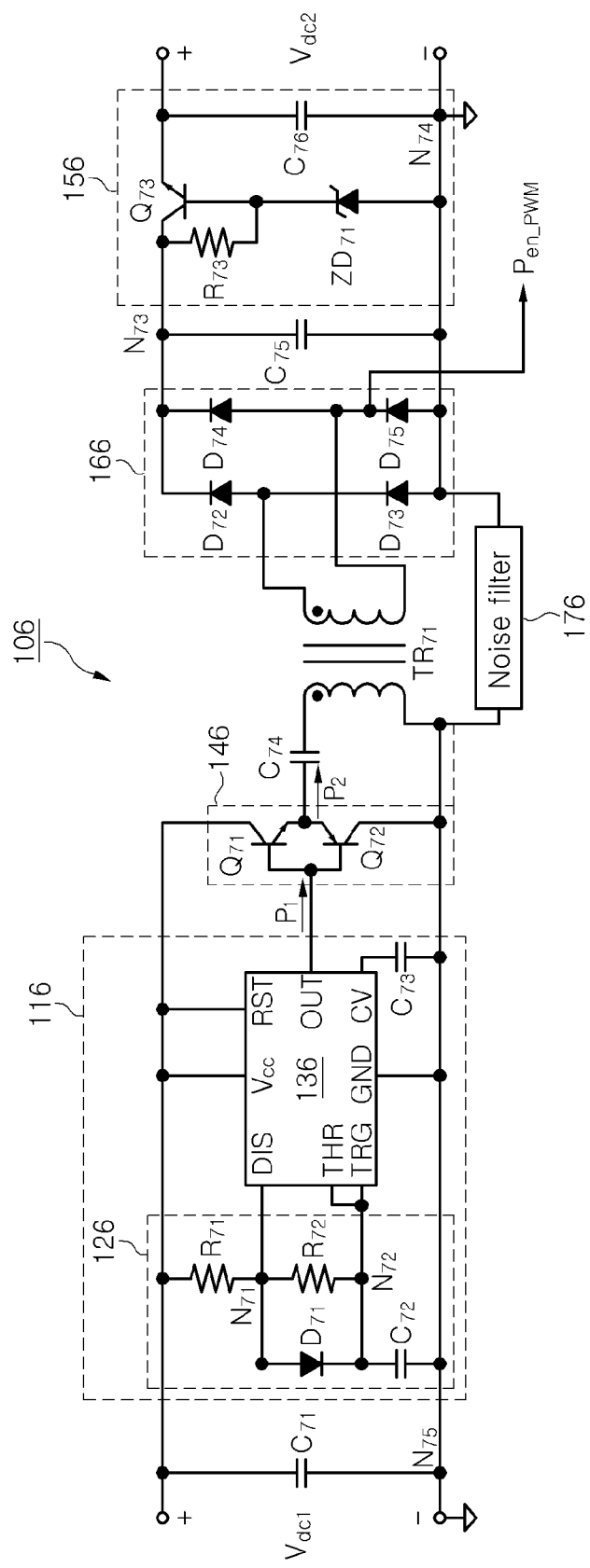
FIG. 7 is a circuit diagram of an exemplary embodiment of a voltage converter in FIG. 3.

FIG. 7 is a circuit diagram illustrating an exemplary embodiment of the voltage converter 106 in FIG. 3, i.e., a DC/DC voltage converter. The voltage converter 106 includes a pulse generator 116, a first amplifier 146, a transformer $TR_{71}$, a second full-wave rectifying unit 166, and a second voltage stabilizer 156. The pulse generator 116 receives the output voltage $V_{dc1}$ of the AC/DC rectifier 104 and generates a high-frequency pulse signal $P_1$. The first amplifier 146 receives the high-frequency pulse signal $P_1$ and outputs an AC square wave signal $P_2$. The transformer $TR_{71}$ receives the AC square wave signal $P_2$ in its primary winding and induces a stepped-up voltage in its secondary winding. The second full-wave rectifying unit 166 full-wave rectifies the voltage $v_2$ induced in the secondary winding of the transformer $TR_{71}$ and outputs a pulse enable signal $P_{en\_PWM}$ to be applied to the PWM controller 108. The second voltage stabilizer 156 stabilizes the voltage (voltage at $N_{73}$) full-wave rectified by the second full-wave rectifying unit 166.

The pulse generator 116 is an oscillator to generate a square wave and includes a duty cycle adjustor 126 and a timer integrated circuit (IC) 136. Although the exemplary embodiment of the timer IC 136 of the pulse generator 116 is an NE555 timer IC in FIG. 7, the timer IC 136 may be any IC which may generate a high-frequency pulse signal.

For example, for the timer IC 136, a GND pin (pin 1) is connected to a ground; a THR (pin 2), TRG (pin 6) and DIS (pin 7) are connected to a peripheral circuit 126 for adjusting a duty cycle (referred to as "duty-cycle adjustor"); a VCC (pin 4) and RST (pin 8) are connected to DC voltage $V_{dc1}$; and a CV (pin 5) is connected to a capacitor $C_{73}$ to stabilize the timer IC 136.

The duty-cycle adjustor 126 includes a first resistor $R_{71}$, a second resistor $R_{72}$ and a capacitor $C_{72}$, which are connected in series to each other, where DC voltage $V_{dc1}$ is applied.

Pin 7 of the timer IC 136 is connected to a node $N_{71}$ between the first resistor $R_{71}$ and the second resistor $R_{72}$; pins 2 and 6 of the timer IC 136 are commonly connected to a node $N_{72}$ between the second resistor $R_{72}$ and the capacitor $C_{72}$. As such, a duty cycle is determined by the operation of the timer IC 136 and a time constant determined by the first resistors $R_{71}$, the second resistor $R_{72}$, and the capacitor $C_{72}$.

As shown in FIG. 7, to generate a high-frequency pulse signal $P_1$ with a duty cycle of 50%, a diode $D_{71}$ may be further included which is connected in parallel to the second resistor $R_{72}$ and is forward biased toward the capacitor $C_{72}$.

The first amplifier 146 receives the high-frequency pulse signal $P_1$ and applies the AC square wave signal $P_2$ to the primary winding of the transformer $TR_{71}$.

For example, as shown in FIG. 7, the first amplifier 146 may include a pair of bipolar junction transistors (BJTs) $Q_{71}$ and $Q_{72}$. The BJT $Q_{71}$ is an NPN transistor and the BJT $Q_{72}$ is a PNP transistor. Bases of the BJTs $Q_{71}$ and $Q_{72}$ are commonly connected to an output of the pulse generator 116; their emitters are commonly connected to each other; and their collectors are connected to an output of the AC/DC rectifier 104. That is, the collector of the BJT $Q_{71}$ is connected to the DC voltage source $V_{dc1}$ and the collector of the BJT $Q_{72}$ is connected to the ground, so that they are driven by the DC voltage source $V_{dc1}$.

The emitters of the BJTs $Q_{71}$ and $Q_{72}$ are commonly connected to the primary winding of the transformer $TR_{71}$ so that the AC square wave signal $P_2$ is output from the emitters to the transformer $TR_{71}$.

A DC cutoff capacitor $C_{74}$ may be further connected in series between the common emitters of the BJTs $Q_{71}$ and $Q_{72}$ and the primary winding of the transformer $TR_{71}$ to block the DC signal.

The second full-wave rectifying unit 166 includes four diodes $D_{72}$, $D_{73}$, $D_{74}$ and $D_{75}$. The second full-wave rectifying unit 166 is connected to the secondary winding of the transformer $TR_{71}$ to full-wave rectify the voltage stepped up by the transformer $TR_{71}$ (i.e., the voltage $v_2$ in the secondary winding of the transformer $TR_{71}$). The capacitor $C_{75}$ is connected in parallel to the output of the second full-wave rectifying unit 166 to stabilize the DC voltage.

The second voltage stabilizer 156 includes a BJT $Q_{73}$, a resistor $R_{73}$, a Zener diode $ZD_{71}$ and a capacitor $C_{76}$, for example.

The BJT $Q_{73}$ illustrated in FIG. 7 is an NPN transistor, a collector of which is connected to the output of the second full-wave rectifying unit 166; an emitter of which is connected to the input of the PWM controller 108; a collector of which is connected to the Zener diode $ZD_{71}$. The resistor $R_{73}$ with a predetermined resistance is connected between the collector and base of the BJT $Q_{73}$, and the Zener diode $ZD_{71}$ is connected between the base of the BJT $Q_{73}$ and the output ground node $N_{74}$ of the voltage converter 106 to supply a predetermined Zener voltage to the base of the BJT $Q_{73}$. The capacitor $C_{76}$ is connected in parallel to the output of the voltage converter 106 to stabilize the DC voltage $V_{dc2}$.

Although the second voltage stabilizer 156 is the BJT $Q_{73}$, especially the NPN BJT, in FIG. 7, it may be a PNP BJT (it should be understood that the other elements would need to be differently designed accordingly) or other circuits capable of stabilizing the DC voltage $V_{dc2}$.

A noise filter 176 may be added between the ground node $N_{75}$ in the primary winding of the transformer $TR_{71}$ and the output ground node $N_{74}$ of the voltage converter 106. The noise filter 176 may generate a stable DC voltage $V_{dc2}$ by stabilizing the ground node $N_{74}$ in the secondary winding of the transformer $TR_{71}$, i.e., the ground at the output of the voltage converter 106, and passing a noise in a circuit connected to the secondary winding of the transformer $TR_{71}$ to the primary winding of the transformer $TR_{71}$.

The noise filter 176 may include a combination of a capacitor, a resistor and the like, or a resistor having a resistance of hundreds of kilo-ohms (kΩ) to thousands of kΩ.

An operation of the voltage converter 106 will be described with reference to FIG. 7. The output voltage $V_{dc1}$ of the AC/DC rectifier 104 is charged or stabilized by the capacitor $C_{71}$, and the timer IC 136 and the transistors $Q_{71}$ and $Q_{72}$ of the first amplifier 146 are driven by the DC voltage $V_{dc1}$ across the capacitor $C_{71}$.

The timer IC 136 generates a high-frequency pulse signal $P_1$ with a predetermined duty cycle which depends on a time constant determined by the first resistor $R_{71}$, the second resistor $R_{72}$, and the capacitor $C_{72}$. The first amplifier 146 amplifies the current using the high-frequency pulse signal $P_1$ and provides an AC square wave signal $P_2$ to the primary winding of the transformer $TR_{71}$ through the DC cutoff capacitor $C_{74}$. The voltage in the primary winding of the transformer $TR_{71}$ is stepped up at a predetermined ratio in the secondary winding of the transformer $TR_{71}$. The stepped-up voltage $v_2$ is full-wave rectified by the second full-wave rectifying unit 166 including the diodes $D_{72}$, $D_{73}$, $D_{74}$ and $D_{75}$. The full-wave rectified voltage is stabilized to the DC voltage (voltage at $N_{73}$) by the capacitor $C_{75}$. The DC voltage is further stabilized to DC voltage $V_{dc2}$ by the second voltage stabilizer 156 and the DC voltage $V_{dc2}$ is applied to the PWM controller 108. Further, the pulse enable signal $P_{en\_PWM}$ is output from a node between the diodes $D_{75}$ and $D_{74}$ of the second full-wave rectif in unit 166 and, therefore, undergoes half-wave rectification to produce stepped-up voltage $v_2$ for a first half-cycle, and a zero voltage for a second half-cycle. The pulse enable signal $P_{en\_PWM}$ is provided to the PWM controller 108 to generate the pulse width modulation signal $V_{PWM}$.

The voltage converter 106 may allow the primary winding of the transformer $TR_{71}$ to generate AC voltage and may allow the secondary winding of the transformer $TR_{71}$, which is electrically isolated from the primary winding, to step up the voltage generated in the primary winding and generate the stable DC voltage $V_{dc2}$.

FIG. 8 is a circuit diagram of an exemplary embodiment of the pulse width modulation (PWM) controller 108 in FIG. 3. The PWM controller 108 includes a duty-cycle control unit 128 including variable resistor $R_{var}$, constant resistor $R_{83}$ and capacitor $C_{82}$, a square wave pulse generator 118, and a second amplifier 138 including BJTs $Q_{81}$ and $Q_{82}$. The output DC voltage $V_{dc2}$ of the voltage converter 106 is charged or stabilized by the capacitor $C_{81}$.

The duty-cycle control unit 128 determines a shift time of the PWM signal $V_{PWM}$ generated by the pulse enable signal $P_{en\_PWM}$ by a time constant that is a function of the variable resistor $R_{var}$, the constant resistor $R_{83}$ and the capacitor $C_{82}$.

The square wave pulse generator 118 receives the pulse enable signal $P_{en\_PWM}$ to shift a square wave pulse $P_3$ to a first level, and the duty-cycle control unit 128 shifts the first-level square wave pulse $P_3$ to a second level. Since the pulse enable signal $P_{en\_PWM}$ is also a square wave, the frequency (or cycle) of the PWM signal $V_{PWM}$ is determined by the pulse enable signal $P_{en\_PWM}$.

For example, assuming that the first level is a high level and the second level is a low level, the square wave pulse generator 118 receives the pulse enable signal $P_{en\_PWM}$ and rises the square wave pulse $P_3$ to the high level, and the raised square wave pulse $P_3$ is shifted to the low level by a time constant determined by the duty-cycle control unit 128. In this manner, a turn-on period of the square wave pulse $P_3$ is determined.

For example, an exemplary embodiment of the square wave pulse generator 118 may be a 4528-series IC. As shown in FIG. 8, in a 4528-series IC, the RC pin of the square wave pulse generator 118 is connected to a node $N_{81}$ between the variable resistor $R_{var}$ and the constant resistor $R_{83}$ and the capacitor $C_{82}$, which are connected in series to each other. The DC voltage $V_{dc2}$ is applied across the variable resistor $R_{var}$, the constant resistor $R_{83}$ and the capacitor $C_{82}$. The pulse enable signal $P_{en\_PWM}$ is applied to the A pin of the square wave pulse generator 118.

The second amplifier 138 receives the output pulse $P_3$ of the square wave pulse generator 118 and outputs the PWM signal $V_{PWM}$. The second amplifier 138 receives the DC voltage $V_{dc2}$ and may include a pair of BJTs $Q_{81}$ and $Q_{82}$. The second amplifier 138 is similar to the first amplifier 146 in the voltage converter 106 and a detailed description thereof will thus be omitted. However, each of the transistors may have a different characteristic in the first amplifier 146 and the second amplifier 138.

Referring again to FIG. 8, the square wave pulse generator 118 and the second amplifier 138 receive the DC voltage $V_{dc2}$ from the voltage converter 106, the square wave pulse generator 118 generates the square wave pulse $P_3$ in response to the pulse enable signal $P_{en\_PWM}$ from the voltage converter 106, and the second amplifier 138 receives the square wave pulse $P_3$ and generates the PWM signal $V_{PWM}$.

As described above, the duty cycle of the PWM signal $V_{PWM}$ is determined by the duty-cycle control unit 128 which is a peripheral circuit of the square wave pulse generator 118, and the turn-on time and frequency of the PWM signal $V_{PWM}$ are determined by the pulse enable signal $P_{en\_PWM}$.

The output of the PWM controller 108, i.e., the PWM signal $V_{PWM}$, may be a square wave signal with a frequency ranging from 20 to 100 kHz or higher, and the pulse width modulation may be controlled at a duty cycle ranging from 1 to 100%.

In the duty-cycle control unit 128, the variable resistor $R_{var}$ may be directly combined with an operating unit (not shown) for dimming the AC LED so that the resistance of the variable resistor $R_{var}$ may be adjusted by the operating unit to adjust the duty cycle of the PWM signal $V_{PWM}$ to thereby dim the AC LED.

Figure 9B:
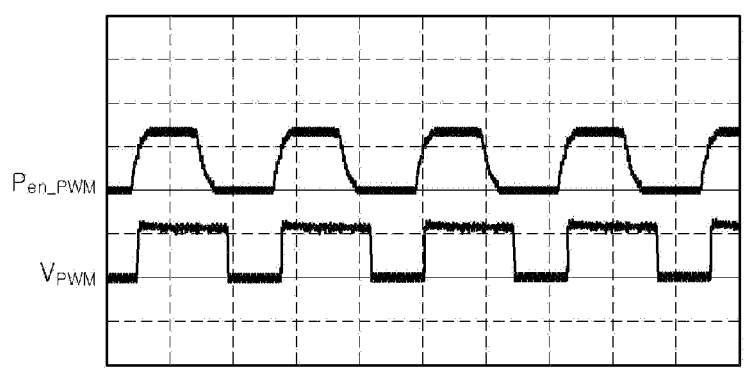
FIG. 9B is a waveform when a pulse width modulation signal $V_{PWM}$ has a duty cycle of 70%.
Figure 9C:
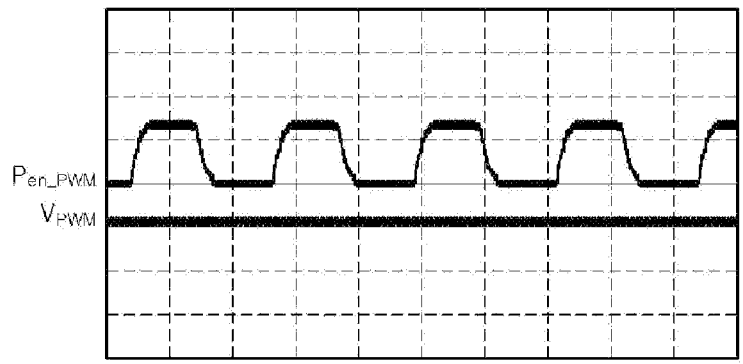
FIG. 9C is a waveform when a pulse width modulation signal $V_{PWM}$ has a duty cycle of 100%.

FIG. 9A, FIG. 9B, and FIG. 9C illustrate some PWM signals for dimming the AC LED. More specifically, FIG. 9A illustrates a waveform when a PWM signal $V_{PWM}$ has a duty cycle of 1%; FIG. 9B illustrates a waveform when a PWM signal $V_{PWM}$ has a duty cycle of 70%; and FIG. 9C illustrates a waveform when a PWM signal $V_{PWM}$ has a duty cycle of 100%.

Referring to FIG. 9A, the pulse enable signal $P_{en\_PWM}$ has a predetermined frequency and, as described above, has the PWM signal $V_{PWM}$ enabled and determines a frequency of the PWM signal $V_{PWM}$.

When the PWM signal $V_{PWM}$ has a duty cycle of 1% by adjusting the variable resistor $R_{var}$ in FIG. 8, the waveform of the PWM signal $V_{PWM}$ may be obtained as shown in FIG. 9A. In this case, since the period during which the switch 110 is turned on is very short, the AC LED produces a very low optical power.

Referring to FIG. 9B, the pulse enable signal $P_{en\_PWM}$ has the same frequency as the pulse enable signal $P_{en\_PWM}$ in FIG. 9A and the variable resistor $R_{var}$ is adjusted so that the PWM signal $V_{PWM}$ has a duty cycle of 70%. In this case, since the switch 110 is turned on longer than in FIG. 9A, the AC LED may produce an optical power greater than in FIG. 9A.

Referring to FIG. 9C, the pulse enable signal $P_{en\_PWM}$ has the same frequency as the pulse enable signal $P_{en\_PWM}$ in FIG. 9A and the variable resistor $R_{var}$ is adjusted so that the PWM signal $V_{PWM}$ has a duty cycle of 100%. In this case, since the switch 110 is kept on, the AC LED may produce maximum optical power.

Figure 10:
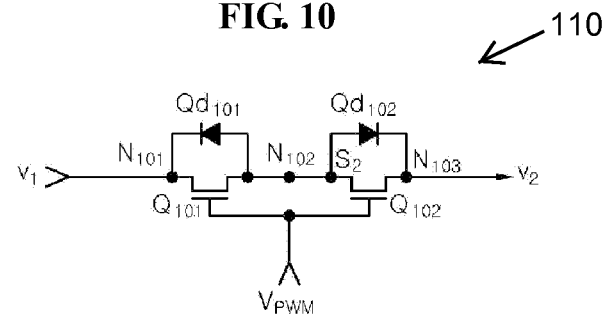
FIG. 10 is a circuit diagram of an exemplary embodiment of a switch in FIG. 3.

FIG. 10 is a circuit diagram of an embodiment of the switch 110 in FIG. 3. When the PWM signal $V_{PWM}$ is at a first level, the switch 110 is in a first operating mode during a positive half cycle of the AC voltage source and is in a second operating mode during a negative half cycle of the AC voltage source. In this case, if the EMI filter 102 is positioned following the AC voltage source (see reference numeral 120 in FIG. 3), electromagnetic interference is eliminated from the AC voltage source by the EMI filter 102 and AC voltage having reduced electromagnetic interference (i.e., $v_{out}$ in FIG. 5A or FIG. 5B) is then provided to the switch 110.

For example, the first level and a second level of the PWM signal $V_{PWM}$, respectively, indicate a voltage level to turn on the transistors $Q_{101}$ and $Q_{102}$ and a voltage level between the gate and source to turn off the transistors $Q_{101}$ and $Q_{102}$.

Since the AC voltage is applied to the switch 110 and the AC LED is used, two operating modes having two different current paths are employed accordingly.

The switch 110 includes the first switching transistor $Q_{101}$ and the second switching transistor $Q_{102}$ and a first inverse diode $Qd_{101}$ and a second inverse diode $Qd_{102}$ which are connected in parallel, respectively, to the first switching transistor $Q_{101}$ and the second switching transistor $Q_{102}$.

The first switching transistor $Q_{101}$ and the second switching transistor $Q_{102}$ are turned on or off by the PWM signal $V_{PWM}$ and connected in series to each other.

The first inverse diode $Qd_{101}$ is connected in parallel between the drain and source of the first switching transistor $Q_{101}$ and the second inverse diode $Qd_{102}$ is connected in parallel between the drain and source of the second switching transistor $Q_{102}$.

In FIG. 10, in the first operating mode, current flows through the first switching transistor $Q_{101}$ and the second inverse diode $Qd_{102}$ In the second operating mode, current flows through the second switching transistor $Q_{102}$ and the first inverse diode $Qd_{101}$. That is, if the PWM signal $V_{PWM}$ is at a level to turn on the switching transistors $Q_{101}$ and $Q_{102}$ (the first level in the example above), the switching transistors $Q_{101}$ and $Q_{102}$ are turned on and only a forward-biased diode ($Qd_{102}$ in the first operating mode; $Qd_{101}$ in the second operating mode) conducts current, resulting in different current paths.

Thus, in an exemplary embodiment of bidirectional switching according to the AC voltage under control of the pulse width modulation signal $V_{PWM}$ to drive the AC LED 180, the switch 110 may be in the first operating mode during the positive half cycle of the AC voltage source and in the second operating mode during the negative half cycle of the AC voltage source while the first level and the second level of the PWM signal $V_{PWM}$, respectively, indicate the voltage level to turn on the transistors $Q_{101}$ and $Q_{102}$ and the voltage level to turn off the transistors $Q_{101}$ and $Q_{102}$.

The respective operating modes will now be described in detail.

For the first operating mode which is a positive half cycle of the AC voltage $v_1$, since the first inverse diode $Qd_{101}$ does not conduct current, current flows or does not flow between the drain $N_{101}$ and the source $N_{102}$ of the first switching transistor $Q_{101}$ according to the PWM signal $V_{PWM}$. On the contrary, since the second inverse diode $Qd_{102}$ is forward biased, current flows through the second inverse diode $Qd_{102}$ between the source $N_{102}$ and the drain $N_{103}$ of the second switching transistor $Q_{102}$. As a result, in the first operating mode, the first switching transistor $Q_{101}$ is controlled according to the PWM signal $V_{PWM}$ to dim the AC LED accordingly.

For the second operating mode which is a negative half cycle of the AC voltage $v_1$, since the second inverse diode $Qd_{102}$ does not conduct current, current flows or does not flow between the drain $N_{103}$ and the source $N_{102}$ of the second switching transistor $Q_{102}$ according to the PWM signal $V_{PWM}$. On the contrary, since the first inverse diode $Qd_{101}$ is forward biased, current flows through the first inverse diode $Qd_{101}$ between the source $N_{102}$ and the drain $N_{101}$ of the first switching transistor $Q_{101}$. As a result, in the second operating mode, the second switching transistor $Q_{102}$ is controlled according to the PWM signal $V_{PWM}$ to dim the AC LED accordingly.

Although an N-type MOSFET is employed as the switching transistors $Q_{101}$ and $Q_{102}$ in FIG. 10, a P-type MOSFET may be used as the switching transistors $Q_{101}$ and $Q_{102}$ or any type of switching transistor may be employed which is rapidly switched by the PWM signal $V_{PWM}$ to apply AC power to the AC LED.

Figure 11A:
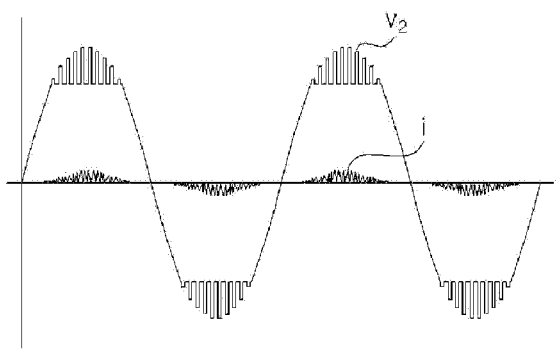
FIG. 11A, FIG. 11B and FIG. 11C are waveforms illustrating the relation between input voltage and input current of an AC LED according to duty cycles of a pulse width modulation signal $V_{PWM}$ in an AC LED dimmer according to an exemplary embodiment of the present invention.
Figure 11B:
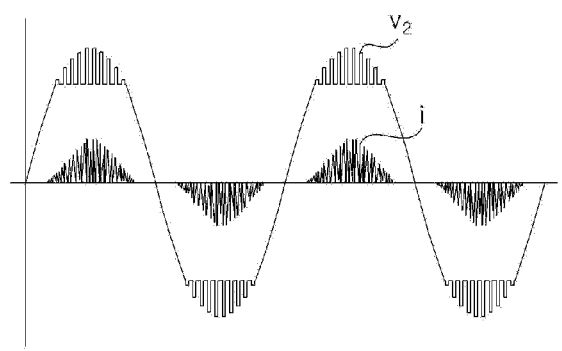
Figure 11C:
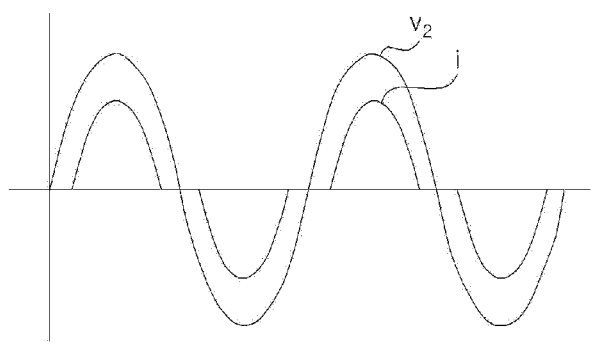

FIG. 11A, FIG. 11B, and FIG. 11C are waveforms illustrating the relation between input voltage and input current of an AC LED according to duty cycles of a PWM signal $V_{PWM}$ in an AC LED dimmer according to an exemplary embodiment of the present invention.

FIG. 11A illustrates a PWM signal $V_{PWM}$ with a duty cycle of 1%; FIG. 11B illustrates a PWM signal $V_{PWM}$ with a duty cycle of 70%; FIG. 11C illustrates a PWM signal $V_{PWM}$ with a duty cycle of 100%. Hence, FIG. 11A, FIG. 11B, and FIG. 11C may be waveforms illustrating the relation between the input voltage and input current of the AC LED, which correspond to FIG. 9A, FIG. 9B, and FIG. 9C, respectively. In FIG. 11A, FIG. 11B, and FIG. 11C, the x-axis indicates time and the y-axis indicates voltage or current.

In FIG. 11A and FIG. 11B, since an on or off period of the switch 110 is included within the cycle of the PWM signal $V_{PWM}$ according to a duty cycle of the PWM signal $V_{PWM}$, the input voltage and current of the AC LED are changed accordingly. Hence, an internal cycle in a period during which the input voltage of the AC LED is changed according to the PWM signal $V_{PWM}$ and an internal cycle in a period during which the input current appears are the same as the cycle of the PWM signal $V_{PWM}$.

In FIG. 11C, since the PWM signal $V_{PWM}$ has a duty cycle of 100%, the switch 110 is kept on, and, therefore, the voltage and current waveforms of the AC voltage source are obtained.

The optical power of the AC LED depends on the voltage multiplied by the current. Hence, as shown in FIG. 11A, FIG. 11B, and FIG. 11C, an increased duty cycle of the PWM signal $V_{PWM}$ leads to an increased peak value; therefore, an increased duty cycle of the PWM signal $V_{PWM}$ leads to an increased optical power of the AC LED.

The PWM signal $V_{PWM}$ may be linearly controlled by adjusting the duty cycle to a predetermined value (between 1 and 100%).

As described above, the AC LED dimmer can achieve an efficient, wide-range dimming function using the PWM signal. Particularly, the AC LED dimmer can solve a limited dimming range and harmonics problems in the conventional dimmer using the Triac.

An exemplary embodiment of an AC LED dimming method includes receiving AC voltage and generating a pulse width modulation signal; driving an AC LED under control of the pulse width modulation signal; and dimming the AC LED by adjusting a duty cycle of the pulse width modulation signal.

The PWM signal may be produced using a variety of ICs and peripheral circuits. For example, as shown in FIG. 6, FIG. 7, FIG. 8 and FIG. 10, the above-mentioned exemplary embodiments of elements to produce the PWM signal in the AC LED dimmer may be employed. Producing the PWM signal by means of the elements is described above and a detailed description thereof will thus be omitted.

According to the AC LED dimming method, the AC LED is dimmed by adjusting the duty cycle of the PWM signal. The AC LED dimming method may further include eliminating electromagnetic interference included in the AC voltage applied to produce the PWM signal or drive the AC LED.

For example, the electromagnetic interference may be eliminated by the exemplary embodiment of the EMI filter illustrated in FIG. 5A or FIG. 5B.

Another exemplary embodiment of an AC LED dimming method includes receiving and full-wave rectifying AC voltage; receiving the full-wave rectified voltage, generating full-wave rectified stepped-up voltage, and generating a pulse enable signal; receiving the full-wave rectified stepped-up voltage and generating a pulse width modulation signal in response to the pulse enable signal; switching bidirectionally according to the AC voltage under control of the pulse width modulation signal to drive an AC LED; and dimming the AC LED by adjusting a duty cycle of the pulse width modulation signal.

The respective operations in the AC LED dimming method may be described with reference to FIG. 6, FIG. 7, FIG. 8 and FIG. 10, for example. More specifically, full-wave rectifying the AC voltage may be performed by the rectifier 104 in FIG. 6; generating the full-wave rectified stepped-up voltage and the pulse enable signal may be performed by the voltage converter 106 in FIG. 7; generating the pulse width modulation signal may be performed by the controller 108 in FIG. 8; driving the AC LED by bidirectional switching may be performed by the switch 110 in FIG. 10.

Further, dimming the AC LED by adjusting the duty cycle may be achieved by the duty-cycle control unit 128 configured such that the variable resistor $R_{var}$ is directly combined with the operating unit (not shown) for dimming the AC LED.

Similarly, the AC LED dimming method may further include eliminating electromagnetic interference included in the AC voltage applied to produce the PWM signal or drive the AC LED.

The AC LED dimming method can achieve an efficient, wide-range dimming function using the PWM control scheme. Further, the AC LED dimmer can suppress harmonics.

As apparent from the above description, according to the exemplary embodiments of the present invention, the AC LED dimmer and the dimming method employ a pulse width modulation scheme capable of addressing the problem of the conventional dimmer in which the dimming range is limited by the drive voltage of the Triac and the characteristics of the resistor and capacitor of the R/C phase controller.

Further, according to the exemplary embodiments of the present invention, the AC LED dimmer and the dimming method thereof can solve the problem of the conventional dimmer in which a number of harmonics are produced in the turn-on switching operation.

In addition, according to the exemplary embodiments of the present invention, the AC LED dimmer and the dimming method can reduce or minimize flickering of the AC LED caused by the insufficient operating margin of the resistor and capacitor of the R/C phase controller in the conventional dimmer.

The various embodiments described above can be combined to provide further embodiments. All patents, patent application publications, patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. It will be apparent to those skilled in the art that various modifications and variations can be made in the present invention without departing from the spirit or scope of the invention. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure. Thus, it is intended that the present invention cover the modifications and variations of this invention provided they come within the scope of the appended claims and their equivalents.

What is claimed is:

1. A method of dimming an alternating current (AC) light-emitting diode (LED) utilizing a pulse width modulation generator, comprising:
    converting an AC input voltage having a first frequency to a first direct current (DC) voltage having a constant value;
    generating a square-wave voltage having a second frequency higher than the first frequency using the first DC voltage, the square-wave voltage having a first positive voltage value for a first half-cycle and a negative voltage value for a second half-cycle;
    full-wave rectifying the square-wave voltage to generate a second DC voltage having a second voltage value;
    half-wave rectifying the square-wave to generate a pulse enable signal having the second frequency, the pulse enable signal having the second voltage value for a first half-cycle and a zero voltage value for a second half-cycle;
    generating a pulse width modulation signal having the second frequency using the second DC voltage and the pulse enable signal, the pulse modulation signal having a duty ratio varying according to a dimming level; and
    driving the LED by using a switch to selectively apply the AC input voltage to the LED according to the duty ratio of the pulse width modulation signal.

2. The method according to claim 1, wherein the full-wave rectifying the square-wave voltage comprises boosting the square-wave voltage through a transformer to generate the second DC voltage isolated from the AC input voltage and the pulse enable signal isolated from the AC input signal.

3. An alternating current (AC) light-emitting diode (LED) dimmer, comprising:
    a power source input unit to which an alternating current (AC) input voltage is input;
    a pulse width modulation (PWM) generator which generates a pulse enable signal in which a duty ratio is adjusted according to a dimming signal;
    a light-emitting diode (LED); and
    a bidirectional switch which supplies the AC input voltage to the LED when the pulse enable signal is a high level, and shuts off the AC input voltage when the pulse enable signal is a low level, the bidirectional switch comprising:
    a first switching device;
    a second switching device connected in series to the first switching device;
    a first backward diode connected in parallel to the first switching device to allow the current applied via the second switching device to flow while bypassing the first switching device, when the AC input voltage has a negative value; and
    a second backward diode connected in parallel to the second switching device to allow the current applied via the first switching device to flow while bypassing the second switching device, when the AC input voltage has a positive value.

4. The AC LED dimmer according to claim 3, wherein the PWM generator generates the pulse enable signal using the AC input voltage, the pulse enable signal being isolated from the AC input voltage.

5. The AC LED dimmer according to claim 4, wherein the PWM generator comprises:
    a rectifier which full-wave rectifies the AC input voltage having a first frequency;
    a voltage converter which converts the full-wave rectified voltage to a first direct current (DC) voltage having a constant value, generating a square-wave voltage having a second frequency higher than the first frequency using the DC voltage, the square-wave voltage having a first positive voltage value for a first half cycle and a negative voltage value for a second-half cycle, full-wave rectifies the square-wave voltage to generate a second DC voltage having a second voltage value, and half-wave rectifies the square-wave to generate a pulse enable signal having the second frequency, the pulse enable signal having the second voltage value for a first half-cycle and a zero voltage value for a second half-cycle; and
    a pulse width modulation controller which generates a pulse width modulation signal having the second frequency using the second DC voltage and the pulse enable signal, the pulse width modulation signal having a duty ratio varying according to the dimming level.

6. The AC LED dimmer according to claim 5, wherein the voltage converter further comprises a transformer which boosts the square-wave voltage and isolates the second DC voltage and the pulse enable signal from the AC input voltage.

* * * * *